United States Patent [19]
Bergum et al.

[11] Patent Number: 5,457,748
[45] Date of Patent: Oct. 10, 1995

[54] METHOD AND APPARATUS FOR IMPROVED SECURITY WITHIN ENCRYPTED COMMUNICATION DEVICES

[75] Inventors: Russell A. Bergum, Lake Zurich; Janes A. Van Bosch, Crystal Lake, both of Ill.

[73] Assignee: Motorola, Inc., Schaumburg, Ill.

[21] Appl. No.: 983,182

[22] Filed: Nov. 30, 1992

[51] Int. Cl.⁶ .................................................. H04L 9/08
[52] U.S. Cl. .......................................................... 380/50
[58] Field of Search ............................. 380/44, 50, 4, 380/45, 49, 21, 23

[56] References Cited

U.S. PATENT DOCUMENTS

| | | | |
|---|---|---|---|
| 4,605,820 | 8/1986 | Campbell, Jr. | 380/45 |
| 4,723,283 | 2/1988 | Nayasawa et al. | 380/44 |
| 4,849,927 | 7/1989 | Vos | 380/4 |
| 4,888,802 | 12/1989 | Cooney | 380/44 |
| 4,924,513 | 5/1990 | Harbison et al. | 380/50 |
| 4,926,475 | 5/1990 | Spiotta et al. | 380/44 |
| 4,934,846 | 6/1990 | Gilham | 380/23 |
| 4,965,828 | 10/1990 | Ergott, Jr. et al. | 380/50 |
| 5,008,936 | 4/1991 | Hamilton et al. | 380/50 |
| 5,081,675 | 1/1992 | Kittirutsunetorn | 380/4 |
| 5,131,040 | 7/1992 | Knapczyk | 380/50 |
| 5,150,412 | 9/1992 | Maro | 380/23 |
| 5,222,136 | 6/1993 | Rasmussen et al. | 380/21 |
| 5,241,597 | 8/1993 | Bright | 380/21 |
| 5,249,227 | 9/1993 | Bergum et al. | 380/50 |
| 5,363,447 | 11/1994 | Rager et al. | 380/50 |
| 5,412,721 | 5/1995 | Rager et al. | 380/49 |

*Primary Examiner*—Salvatore Cangialosi
*Attorney, Agent, or Firm*—Christopher P. Moreno; Timothy W. Markison

[57] ABSTRACT

Within a communication device which utilizes digital encryption, volatile and non-volatile memory devices are used for the storage of encryption keys in unencrypted and encrypted form, respectively. A power sensing circuit, in conjunction with tamper detection circuitry, is used to help ensure the active erasure of keys from the volatile memory in the event of a non-secure operating condition.

5 Claims, 2 Drawing Sheets

5,457,748

METHOD AND APPARATUS FOR IMPROVED SECURITY WITHIN ENCRYPTED COMMUNICATION DEVICES

FIELD OF THE INVENTION

This invention relates generally to encrypted communication devices and, in particular, to the improved security thereof.

BACKGROUND OF THE INVENTION

Communication systems are known to comprise mobile transmitters and receivers, such as in-car mobile or hand-held portable radios (mobiles), as well as fixed transmitters and fixed receivers, such as base stations or repeaters (fixed end). The mobiles and fixed end are operably coupled by separate transmit and receive communication paths. The communication paths between the mobiles and the fixed end are typically wireless links, such as radio frequency (RF) channels. The communication paths between fixed transmitters and receivers are typically wireline links, such as land-based phone lines.

A typical message within such a communication system may begin with a mobile unit converting an audio signal into a digital data stream suitable for transmission over an RF channel to either another mobile unit or the fixed end. Such systems are often used by public safety institutions, such as local or federal law enforcement agencies. The existence of commercially available radio frequency scanners makes it possible for unauthorized parties to monitor the information transmitted within such a communication system. In efforts to reduce unauthorized eavesdropping, communication systems use digital encryption methods that protect proprietary information transmitted therein.

Digital encryption methods use a known, reversible algorithm to introduce randomness into a digital data stream. To an unauthorized user, an encrypted digital data stream will appear random, and thus unintelligible. Such an algorithm that randomizes digital data is called an encryptor. By necessity, the same algorithm which is capable of encrypting the digital data stream must also be capable of recovering the digital data stream, and hence, is called a decryptor. Often, an encryptor/decryptor algorithm utilizes a dynamic parameter, hereafter referred to as a key, to uniquely specify the nature of the randomness introduced to the digital data stream. Thus, only encryptors and decryptors utilizing an identical algorithm and key are capable of reproducing intelligible messages. Obviously, the security of keys in systems utilizing encryption is of the utmost importance in the prevention of unauthorized monitoring. If the keys of a known encryptor/decryptor algorithm are made available, the ability of unauthorized parties to monitor proprietary communications is greatly enhanced.

Typically, within an encrypted communication unit, the keys used by the encrypted communication unit are stored in a volatile memory device such as RAM (Random Access Memory). This method of storage allows the communication unit to quickly access keys, as might be required for a feature such as encrypted mode channel scanning. Also, the use of a volatile memory allows the key information to be erased in the event that the communication unit loses power or is tampered with, thus maintaining security. For instance, if a communication unit is powered down or tampered with, the information stored in volatile memory is passively erased. Passive erasure typically implies allowing the information stored in volatile memory to decay away with the loss of power. When the communication unit is subsequently powered up, however, an external device is typically required to reload the keys. This requirement can prove to be nuisance in communication units in which power is frequently cycled, such as hand-held portable radios.

A further shortcoming of the use of volatile memory for the storage of key information is that passive erasure of such devices is often unreliable. It has been shown that some RAM devices, despite the sustained absence of power for several minutes (in some cases, hours), may retain some or all of the key information stored therein. This availability of key information could result in a severe breech of security to the entire communication system. Thus, a need exists for a method which allows the use of volatile memory for key storage without the risk of ineffective passive key erasure, and in the event of successful key erasure, without the need for external key reloading.

DESCRIPTION OF A PREFERRED EMBODIMENT

Generally, the present invention provides a method and apparatus for greater security in storing and utilizing encryption/decryption keys (keys). This is accomplished by storing encrypted representations of the keys in a non-volatile memory device such as EEPROM (Electrically Erasable Programmable Read Only Memory). When the communication unit is powered up, the encrypted representations of the keys are decrypted to reconstruct the keys, and the reconstructed keys are stored in a volatile memory such as RAM. With the keys stored in RAM, the communication unit can rapidly access the keys such that information can be encrypted and decrypted quickly.

The present invention also provides enhanced security when the communication unit loses power, or is tampered with. Either condition causes an active erasure of the keys stored in RAM. The erasure procedure is sequentially performed by erasing a portion of each key such that within a few microseconds, all the keys are corrupted.

Figure 1:
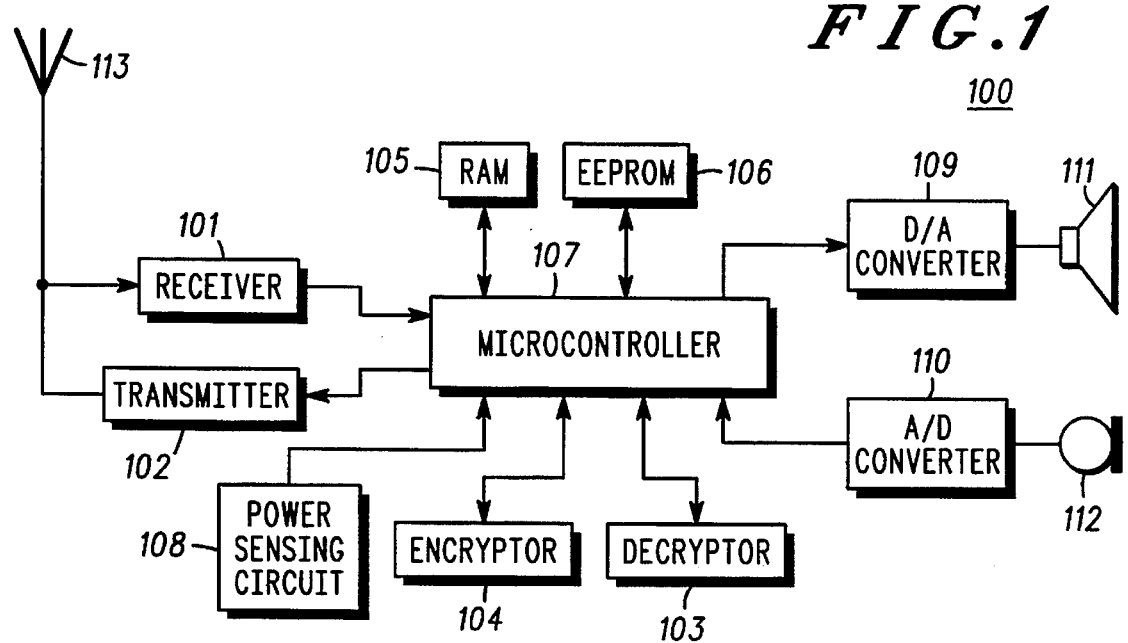
FIG. 1 illustrates a functional block diagram of a communication unit in accordance with the present invention.

The present invention can be more fully described with reference to FIGS. 1–3. FIG. 1 illustrates a communication unit 100 that comprises a receiver 101, a transmitter 102, a decryptor 103, an encryptor 104, RAM 105, EEPROM 106, a microcontroller 107, a power sensing circuit 108, a digital-to-analog converter 109, an analog-to-digital converter 110, a speaker 111, a microphone 112, and an antenna 113. The communication unit 100 may be any communication device that requires encrypted data transmission and/or reception, such as a hand-held mobile radio or a fixed end transceiver. The microcontroller 107 may comprise a Motorola 68HC11K4 microcontroller. The decryptor 103 and encryptor 104 may comprise either a single or separate IC devices.

Operation of the communication unit 100 requires encrypted representations of keys to be stored in the EEPROM 106. When adding new keys or changing existing keys within the communication unit 100, an external device is used to download the new, unencrypted keys into the RAM 105. A known encryption key (hereafter referred to as the master key), other than the keys to be encrypted, is stored in the encryptor 104 by the microcontroller 107. The microcontroller 107 then uses the master key and the encryptor 104 to encrypt the keys stored in the RAM 105 as well as the master key itself. These encrypted keys are then stored in the EEPROM 106. Upon power down, the unencrypted keys in the RAM 105 are erased and the unencrypted master key is stored in the decryptor 103. Upon subsequent power ups, the microcontroller 107 verifies that the master key in the decryptor 103 is still valid. If it is not, a warning flag is set by the microcontroller 107 indicating that the communication unit 100 has been tampered with. If the master key is still valid, the microcontroller 107 sends a known pseudo-random data stream to the encryptor 104 and recovers a resultant key stream. The microcontroller 107 uses the key stream to decrypt the encrypted keys residing in EEPROM 106. The decrypted keys are then stored in RAM 105 for convenient access by the microcontroller 107.

With unencrypted keys stored in RAM 105, normal operation of the communication unit can begin. To process an encrypted voice message transmission, the microcontroller 107 loads a key from RAM 105 into the encryptor 104. When a user speaks into the microphone 112, the analog-to-digital converter 110 creates a digital data stream representation of the voice signal. This digital data is sent to the microcontroller 107, where the data is packaged and synchronously transferred to the encryptor 104. Within the encryptor 104, a known encryption algorithm, such as DES (Data Encryption Standard), utilizes the key to encrypt the data. The microcontroller 107 retrieves the encrypted data from the encryptor 104 and routes it to the transmitter 102.

Reception of an encrypted voice message proceeds in the opposite direction. The microcontroller 107 loads a key from RAM 105 into the decryptor 103. The receiver 101 sends encrypted data to the microcontroller 107 which routes it to the decryptor 103. Within the decryptor 103, the identical encryption algorithm used to encrypt the data, such as DES, utilizes the key to decrypt the data. The microcontroller 107 retrieves the decrypted data from the decryptor 103 and routes it to the digital-to-analog converter 109. Finally, the voice message can be heard by sending the output of the digital-to-analog converter 109 to the speaker 111. It is understood that the messages to be encrypted and decrypted are not restricted to voice messages only; message data such as an ASCII representation of a text file could also be used.

It is further understood that the RAM 105 and the EEPROM 106 may be discrete components or part of the microcontroller 107. A preferred embodiment of the present invention utilizes the latter option. The greatest advantage in having the RAM 105, the EEPROM 106, and the microcontroller 107 within the same device is enhanced security. By pulling these blocks into the microcontroller 107, such as the Motorola 68HC11K4, all accesses to the RAM 105 or the EEPROM 106 must go through the microcontroller 107. Any efforts to override this (i.e. attempting to use the bootstrap mode of the Motorola 68HC11K4) will result in the microcontroller 107 automatically erasing the contents of the RAM 105 and the EEPROM 106. Other benefits include parts and cost reduction, as well as improved access time.

The placement of unencrypted keys in the RAM 105 and encrypted keys in the EEPROM 107 inherently causes security risks. In order to provide maximum key security, the communication unit 100 must be protected against tampering by an adversary. This is accomplished with a tamper loop and tamper detect circuit. The tamper loop is an electrical path that must be broken in order to physically access any devices containing key information. If an attempt is made to disassemble or tamper with the communication unit 100, the tamper circuitry will detect that the loop has been broken. The tamper circuit will trigger the microcontroller 107 to erase the key stored in the decryptor 103. If the communication unit 100 is currently powered and operational during the tamper attempt, the microcontroller 107 will execute an interrupt routine, where it determines the cause of the interrupt. Upon determining that the interrupt was caused by a tamper violation, the microcontroller 107 immediately erases all keys stored in the RAM 105 and executes a reset power up routine. In the power up routine, the microcontroller 107 will check the validity of the master key stored in the decryptor 103. The microcontroller 107 then determines that the master key in the decryptor 103 is invalid, and an error flag is set by the microcontroller 107 indicating that a tamper has occurred.

If a tamper occurs when the communication unit 100 is powered down, the tamper circuit simply erases the key stored in the decryptor 103. This is possible because the decryptor 103 is always powered, regardless of the state of the communication unit 100. When power is eventually supplied to the communication unit 100, the microcontroller 107 immediately determines that the master key stored in the decryptor 103 has been corrupted, and an error flag is set indicating that a tamper violation has occurred. After such an occurrence the microcontroller 107 will have no means to recover the encrypted keys from the EEPROM 106.

In conjunction with the tamper loop and tamper detect circuitry, the power sensing circuit 108 ensures proper operation of the microcontroller 107 during periods of power supply transition or tamper detection. In particular, the power sensing circuit 108 must allow the microcontroller 107 to come out of the reset state correctly during power up conditions, and to allow the microcontroller 107 to erase all key information stored in RAM 105 before entering the reset state during power down or tampering conditions.

Figure 2:
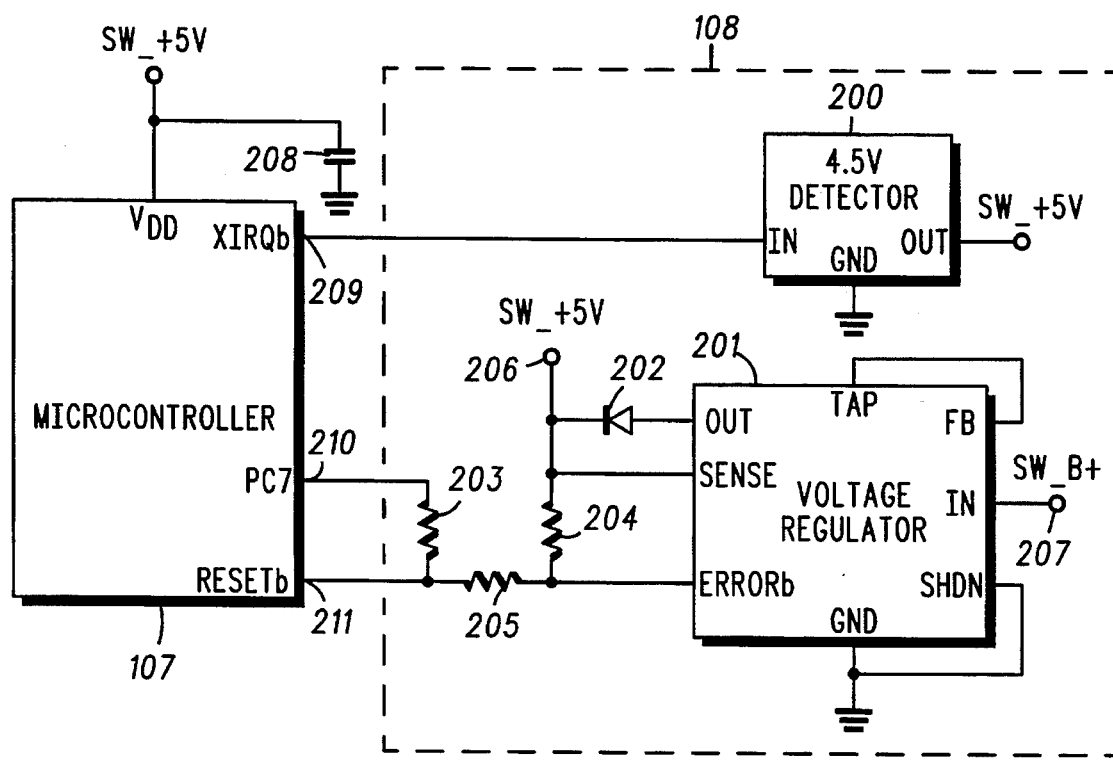
FIG. 2 illustrates a power sensing circuit in accordance with the present invention.

FIG. 2 illustrates the power sensing circuit 108 connected to the microcontroller 107. The power sensing circuit 108 comprises a low voltage detector 200, a voltage regulator 201, a Schottky diode 202, resistors 203, 204 and 205, a regulated voltage supply (SW_+5 V) 206, a battery voltage supply (SW_B+) 207, a backup power capacitor 208, a non-maskable interrupt (XIRQb) 209, a reset override pin (PC7) 210, and a reset input (RESETb) 211. The low voltage detector 200 may comprise a Seiko S-8054 voltage detector. The voltage regulator 201 may comprise a National Semiconductor LP2951CM voltage regulator. The pin names shown for the non-maskable interrupt 209, the reset override pin 210, and the reset input 211 assume that the microcontroller 107 used in the present invention is a Motorola MC68HC11K4 microcontroller.

On power up, the reset input 211 rises with the regulated voltage supply 206 until approximately 1.0 V. At this point (battery voltage supply 207=1.3 V), the ERRORb output of the voltage regulator 201 is set to logic low, asserting the reset input 211 through resistor 205, holding the microcontroller 107 in reset. When the reset input 211 is asserted, the regulated voltage supply 206 is well below the lower limit operating voltage of the microcontroller 107. In the case of the Motorola MC68HC11K4 microcontroller, this lower limit is specified as 3 V. Thus all I/O pins of the microcontroller 107 are in their default reset states. The reset state defaults all I/O pins of the microcontroller 107 to inputs with pull-ups enabled (where available). The present invention requires that the reset override pin 210 default on reset to an input without an internal pull-up device, thus preventing contention between the reset override pin 210 and the ERRORb output of the voltage regulator 201 during power up. When using a Motorola MC68HC11K4 microcontroller as the microcontroller 107, the best mode of the present invention designates pin 7 of Port C (PC7) as the reset override pin 210 because all Port C I/O pins are without pull-up devices. The reset input 211 is held low by the ERRORb output of the voltage regulator 201 until the regulated voltage supply 206 reaches 4.75 V. When the regulated voltage supply 206 reaches 4.75 V, the ERRORb output of the voltage regulator 201 is tri-stated (open drain device) and the microcontroller 107 is pulled out of reset through the pull-up path of resistor 204 and resistor 205. This causes the microcontroller 107 to execute its power up routine. During execution of the power up routine, the reset override pin 210 is configured as a logic high output, thus holding the microcontroller 107 out of reset.

The power down sequence begins with the removal of the battery voltage supply 207. The regulated voltage supply 206 then begins to decay exponentially due to the backup power capacitor 208 connected to the regulated voltage supply 206 input (VDD) of the microcontroller 107. The backup power capacitor 208 stores enough charge to allow the microcontroller 107 to continue operating before the regulated voltage supply 206 drops below the lower limit operating voltage of the microcontroller 107. The Schottky diode 202 is used to isolate the charge stored in the backup power capacitor 208, ensuring that the charge does not discharge through the voltage regulator 201. When the battery voltage supply 207 drops below 4.75 volts, the ERRORb output of the voltage regulator 201 is asserted logic low. The microcontroller 107, however, is not reset because the reset override pin 210 holds the reset input 211 high through resistor 203. The value of resistor 203 is chosen small enough to minimize the resistor divider effect seen when the reset override pin 210 overrides the ERRORb output of the voltage regulator 201 and large enough so that the current drive capability of the reset override pin 210 is not exceeded. Also, as the battery voltage supply 207 drops below 4.5 V, the low voltage detector 200 pulls the non-maskable interrupt 209 low, thus starting the sequence which erases all key information from the RAM 105. When the microcontroller 107 finishes erasing the RAM 105, the reset override pin 210 is re-configured as an input. This turns control of reset input 211 over to the ERRORb output of the voltage regulator 201 (which is already low) and the microcontroller 107 is immediately pulled into reset.

Figure 3:
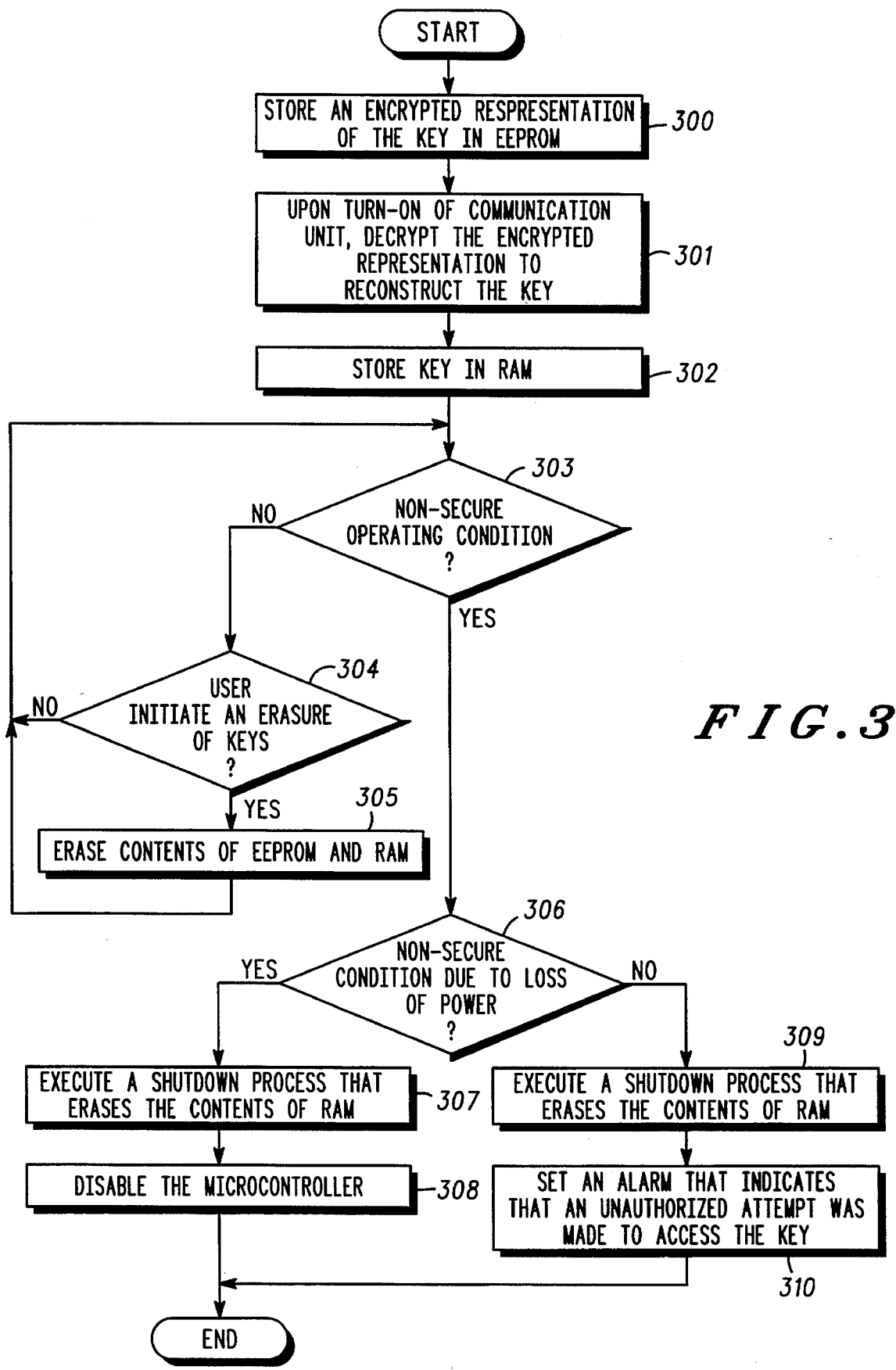
FIG. 3 illustrates a flow chart which may be used to implement the present invention.

FIG. 3 illustrates a logic diagram of the present invention which the microcontroller 107 could perform to implement the present invention. At step 300, the microcontroller 107 stores an encrypted version of the keys in the EEPROM 106, as described previously. Subsequent power-ups will cause the microcontroller 107, in conjunction with the decryptor 103, to decrypt the encrypted keys residing in EEPROM 106, as shown in step 301. At step 302, the microcontroller 107 stores the reconstructed keys in the RAM 105, which will allow the microcontroller 107 to quickly access the keys during normal operation.

During normal operation, step 303 allows the microcontroller 107 to determine if the unit is in a non-secure operating condition, such as a loss of power or a tamper situation. If the unit is not in a non-secure condition, flow moves on to step 304. Here, the microcontroller 107 determines if a user initiated key erase request has been made. The user could do this in two ways; by executing a menu command or by pressing a hardware key erase switch. Both methods require that the unit be powered up at the time of the request. Regardless of the source of the request, the microcontroller 107 will erase all keys in the RAM 105 and in the EEPROM 106. If no such request has been made, flow returns to step 303.

If the microcontroller 107 determines that the unit is in a non-secure operating condition at step 303, flow moves to step 306 to determine the nature of the non-secure condition. If the non-secure condition is due to a loss of power, a process is executed which, in addition to storing the master key in the decryptor 103, erases all keys in the RAM 105 before allowing the microcontroller 107 to reset, as shown in step 307 and step 308. At step 308, the microcontroller 107 releases control of the reset input 211 to the power sensing circuit 108 by changing the reset override pin 210 to an input. The power sensing circuit 108 then pulls the microcontroller 107 into reset, which effectively disables the communication unit 100 until power is restored to a valid voltage level.

If the non-secure condition detected at step 303 is not due to a loss of power, it is assumed at step 306 that the module is being tampered with. This condition causes the microcontroller 107 to immediately erases the keys in RAM 105 without writing the master key to the decryptor 103. A power-up reset operation is then performed, during which the validity of the master key stored in the decryptor 103 is checked. Upon determining that the master key has been corrupted, the microcontroller 107 sets a flag indicating that the module has been tampered with.

It is important to note that the microcontroller 107 actively erases the keys in the RAM 105 in such a manner that all keys are partially erased as quickly as possible. In a preferred embodiment, the microcontroller 107 initially overwrites the first two bytes of each key, starting with the first key and proceeding to the last key. It continues overwriting two bytes from each key until all bytes of all the keys are corrupted.

The present invention, through the use of a power sensing circuit operably coupled to a microcontroller, improves the security of communication devices utilizing encryption by ensuring the active erasure of keys from volatile memory in the event of a non-secure operating condition. By storing encrypted representations of keys in non-volatile memory, the present invention also eliminates the need to externally reload keys into volatile memory after each instance in which they have been erased.

We claim:

1. In a communication unit that includes a transmitter, a receiver, encryption means for encrypting information transmitted via the transmitter, decryption means for decrypting information received by the receiver, and at least one key that is used by the encryption means and the decryption means for respectively encrypting and decrypting information, an improved method for maintaining security of the at least one key, the method comprises the steps of:

a) storing an encrypted representation of the at least one key in non-volatile memory;

b) upon power up of the communication unit, decrypting the encrypted representation of the at least one key by the decryption means to reconstruct the at least one key;

c) storing the at least one key in volatile memory;

d) detecting, by a processing circuit, a non-secure operating condition, wherein the non-secure operating condition comprises one of a set of conditions that includes power loss to the communication unit and tampering to the communication unit; and e) upon detecting the non-secure operating condition, erasing the at least one key from the volatile memory.

2. In the method of claim 1, wherein the volatile memory stores a plurality of keys, step (e) further comprises sequentially erasing a portion of each of plurality of keys until each of the plurality of keys is completely erased.

3. The method of claim 1 further comprises erasing the encrypted representation of the at least one encrypted key from the non-volatile memory when the communication unit is not in a non-secure operating condition.

4. An improved communication unit that includes a transmitter, a receiver, encryption means for encrypting information transmitted via the transmitter, decryption means for decrypting information received by the receiver, and at least one key that is used by the encryption means and the decryption means for respectively encrypting and decrypting information, wherein the improvement comprises:

non-volatile memory means for storing an encrypted representation of the at least one key;

volatile memory means, operably coupled to the non-volatile memory means, for storing, while the communication unit is in a secure operating condition, a recaptured representation of the at least one key;

detection means for detecting a non-secure operating condition for the communication unit, wherein the non-secure operating condition comprises one of a set of conditions that includes power loss to the communication unit and tampering to the communication unit; and erasure means, operably coupled to the detection means and the volatile memory means, for erasing the recaptured representation of the at least one key when the non-secure operating condition is detected.

5. In the improved communication unit of claim 4, the erasure means further comprises means to erase the encrypted representation of the at least one key from the non-volatile memory when the communication unit is not in the non-secure operating condition.

\* \* \* \* \*